Feb. 17, 1948.     S. F. WEYBREW     2,436,341
SLIP-INDICATING SYSTEM FOR ELECTRICALLY-PROPELLED LOCOMOTIVES
Filed Nov. 8, 1945

WITNESSES:
E. A. McCloskey
J. S. Philiott

INVENTOR
Sydney F. Weybrew
BY
G. M. Crawford
ATTORNEY

Patented Feb. 17, 1948

2,436,341

UNITED STATES PATENT OFFICE 2,436,341

SLIP-INDICATING SYSTEM FOR ELECTRICALLY PROPELLED LOCOMOTIVES

Sydney F. Weybrew, St. Louis, Mo., assignor to Westinghouse Electric Corporation, East Pittsburgh, Pa., a corporation of Pennsylvania Application November 8, 1945, Serial No. 627,497

2 Claims. (Cl. 177—311)

My invention relates, generally, to control systems and, more particularly, to systems for controlling the operation of self-propelled locomotives of the Diesel-electric type.

Numerous schemes have been proposed for detecting and indicating slippage of the driving wheels of an electrically-propelled locomotive. Some of these schemes are suitable for use only with motors connected in series-circuit relation, some only with motors connected in parallel-circuit relation and others only with motors connected in series-parallel-circuit relation.

An object of my invention, generally stated, is to provide a simplified and improved slip-indicating system for electrically-propelled locomotives.

A more specific object of my invention is to provide a slip-indicating scheme which is suitable for use with motors connected in series, parallel, or series-parallel-circuit relation.

Other objects of my invention will be explained fully hereinafter or will be apparent to those skilled in the art.

In accordance with an embodiment of my invention the actuating coils of a relay of the differential type are so connected in the circuit for the motors of a locomotive that the relay is responsive to any unbalance in the motor voltages caused by wheel slippage. The contact members of the relay may be utilized to control the energization of a lamp or other signalling device.

For a fuller understanding of the nature and objects of my invention, reference may be had to the following detailed description, taken in conjunction with the accompanying drawing, in which.

Figure 1:
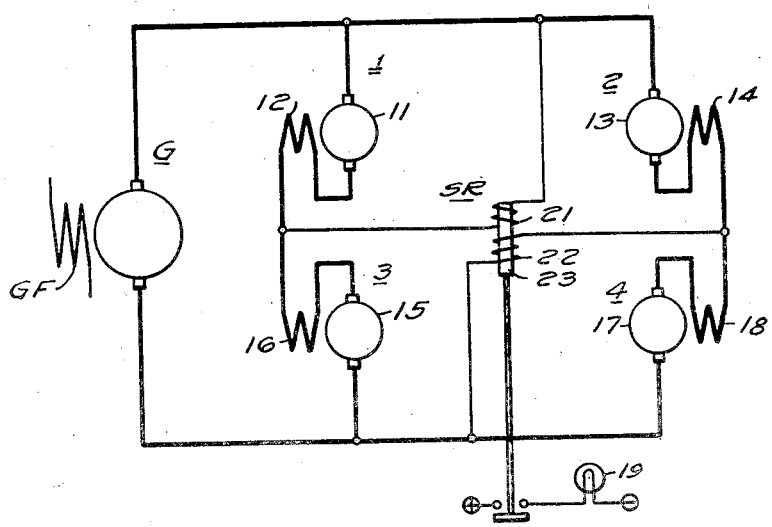
Figure 1 is a diagrammatic view of a control system embodying my invention.

Referring to the drawing, and particularly to Figure 1, the system shown therein, comprises a plurality of motors 1, 2, 3 and 4 which may be of the series type suitable for propelling an electric locomotive or other vehicle. The motor 1 is provided with an armature winding 11 and a series field winding 12. The motor 2 is provided with an armature winding 13 and a series field winding 14. Likewise, the motor 3 is provided with an armature winding 15 and a series field winding 16, and the motor 4 is provided with an armature winding 17 and a series field winding 18.

The power for operating the motors may be supplied from a generator G which may be driven by a Diesel engine or other suitable prime mover (not shown). The generator G is provided with a field winding GF which may be energized from an exciter or other suitable source of excitation current (not shown).

As shown in Fig. 1, the motors 1 and 3 are connected in series-circuit relation and the motors 2 and 4 are connected in series-circuit relation. The two pairs of series-connected motors are connected across the generator G in parallel-circuit relation, thereby providing the well known series-parallel connection of the motors. It will be understood that other arrangements of the motors may be utilized, if desired.

In order to provide a visual indication of any wheel slippage which may take place during operation of the locomotive, and particularly during the accelerating period, a relay SR and an indicating lamp 19, or other suitable signalling device, are provided. The relay SR is of the differential type having actuating coils 21 and 22 which are so disposed on a core 23 that the magnetic forces produced by the coils are in opposition. Thus, when equal amounts of current are flowing through the coils, the magnetic forces balance each other and the contact members of the relay remain open. However, when the current in one coil exceeds that in the other coil the contact members of the relay are closed, thereby energizing the lamp 19.

In the system shown in Fig. 1 the coil 21 of the relay SR is connected across the armature winding 11 and the series field winding 12 of the motor 1. The coil 22 is connected across the armature winding 17 and the series field winding 18 of the motor 4. Therefore, under normal conditions when all motors are operating at the same speed, the same potential is applied to both coils of the relay and equal amounts of current flow through both coils. However, if the wheels driven by one of the motors, for example the motor 1, slip, this motor will increase in speed, thereby increasing the counter-electromotive force of the motor. Accordingly, the unbalance in the motor speeds causes an unbalance in the potential applied to the coils of the relay SR, thereby causing the relay to close its contact members to energize the lamp 19 from a battery or other suitable power source.

It will be seen that the slipping of the wheels driven by any one of the other motors will also cause an unbalance in the potential applied to the coils of the relay. Thus, if the wheels driven by the motor 2 slip, the increase in the counter-electromotive force of the motor 2 causes a corresponding decrease in the voltage of the motor 4, which in turn, decreases the potential applied to the coil 22 of the relay, thereby operating the relay to energize the light 19. In this manner, the slippage of the wheels driven by any one of the motors is indicated to the operator of the vehicle who may then reduce the power supplied to the motors by reducing the generator voltage, thereby correcting the wheel slippage.

Figure 2:
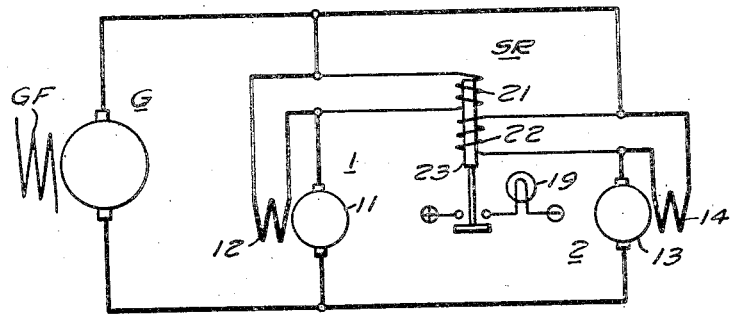
Fig. 2 is a diagrammatic view of a modification of my invention.

In the modification of the invention shown in Fig. 2 only two traction motors are utilized. These motors are connected in parallel-circuit relation across the generator G. The actuating coil 21 of the relay SR is connected across the series field winding 12 of the motor 1 and the actuating coil 22 is connected across the series field winding 14 of the motor 2.

Under normal conditions, when both motors are operating at the same speed, equal amounts of current are flowing through the field windings 12 and 14 and the potentials applied to the coils 21 and 22 are equal. If one of the axles slips its motor will increase in speed, thereby causing a reduction in the current in its series field winding because of the increase in the counter-electromotive force of the motor. The unbalance in the currents through the field windings creates an unbalance in the voltage drops across these windings, thereby causing a difference in the potentials applied to the coils 21 and 22, which in turn, causes the operation of the relay SR to energize the lamp 19.

Figure 3:
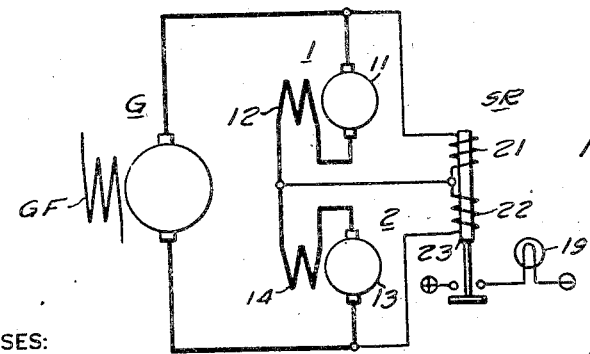
Fig. 3 is a diagrammatic view of another modification of my invention.

In the system shown in Fig. 3 the motors 1 and 2 are connected in series-circuit relation across the generator G. The actuating coil 21 of the relay SR is connected across the armature winding 11 and the series field winding 12 of the motor 1, and the actuating coil 22 is connected across the armature winding 13 and the series field winding 14 of the motor 2. Thus, a difference in the speeds of the two motors resulting from wheel slippage causes an unbalance in the potentials applied to the actuating coils and the relay is operated to energize the lamp 19.

From the foregoing description it is apparent that I have provided a slip indicating scheme which requires only a relay of a relatively simple construction that may be so connected in the motor circuits that it will be responsive to the slippage of the wheels driven by any one of a plurality of traction motors. The present system may be utilized with motors connected in series, parallel, or series-parallel-circuit relation and does not require the provision of voltage balancing resistors, such as are required with systems previously known in the art.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, two pairs of traction motors, each motor having an armature winding and a series field winding, said motors being connected to a power source in series-parallel circuit relation, a differential relay having a pair of actuating coils, one of said coils being connected directly across the armature winding and the field winding of one of the motors of one pair of series-connected motors, the other of said coils being connected directly across the armature winding and the field winding of one of the motors of the other pair of series-connected motors, whereby said relay is responsive to an unbalance in the motor speeds, and signalling means energized through said relay.

2. In a control system, in combination, a plurality of traction motors, each motor having an armature winding and a series field winding, said motors being connected in groups of series-connected motors, said groups of motors being connected to a power source in parallel-circuit relation, a differential relay having a pair of actuating coils, one of said coils being connected directly across the armature winding and the field winding of one of the motors of one group of series-connected motors, the other of said coils being connected directly across the armature winding and the field winding of one of the motors of another group of series-connected motors, whereby said relay is responsive to an unbalance in the motor speeds, and signalling means energized through said relay.

SYDNEY F. WEYBREW.

REFERENCES CITED

The following references are of record in the file of this patent:

UNITED STATES PATENTS

| Number | Name | Date |
|---|---|---|
| 2,006,173 | McNairy et al. | June 25, 1935 |
| 2,117,196 | McNairy | May 10, 1938 |
| 2,197,643 | Konn | Apr. 16, 1940 |
| 2,209,826 | Ogden | July 30, 1940 |
| 2,371,832 | Lillquist | Mar. 20, 1945 |
| 2,372,145 | Weybrew | Mar. 20, 1945 |